Figure 1:
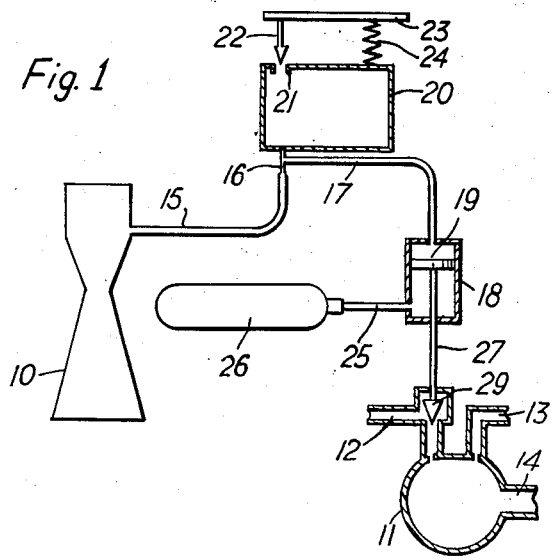

Oct. 15, 1963  S. L. BRAGG ETAL  3,106,822
ROCKET MOTOR

Filed May 23, 1960  5 Sheets-Sheet 1

Stephen Lawrence Bragg, &
William Roger Gibbings
Inventors

By
Fred L. Witherspoon, Jr. &
Fred E. Shoemaker  Attorneys

Oct. 15, 1963   S. L. BRAGG ETAL   3,106,822
ROCKET MOTOR
Filed May 23, 1960   5 Sheets-Sheet 2

Stephen Lawrence Bragg &
William Roger Gibbings
Inventors

By
Fred L. Witherspoon, Jr. &
Fred E. Shoemaker   Attorneys

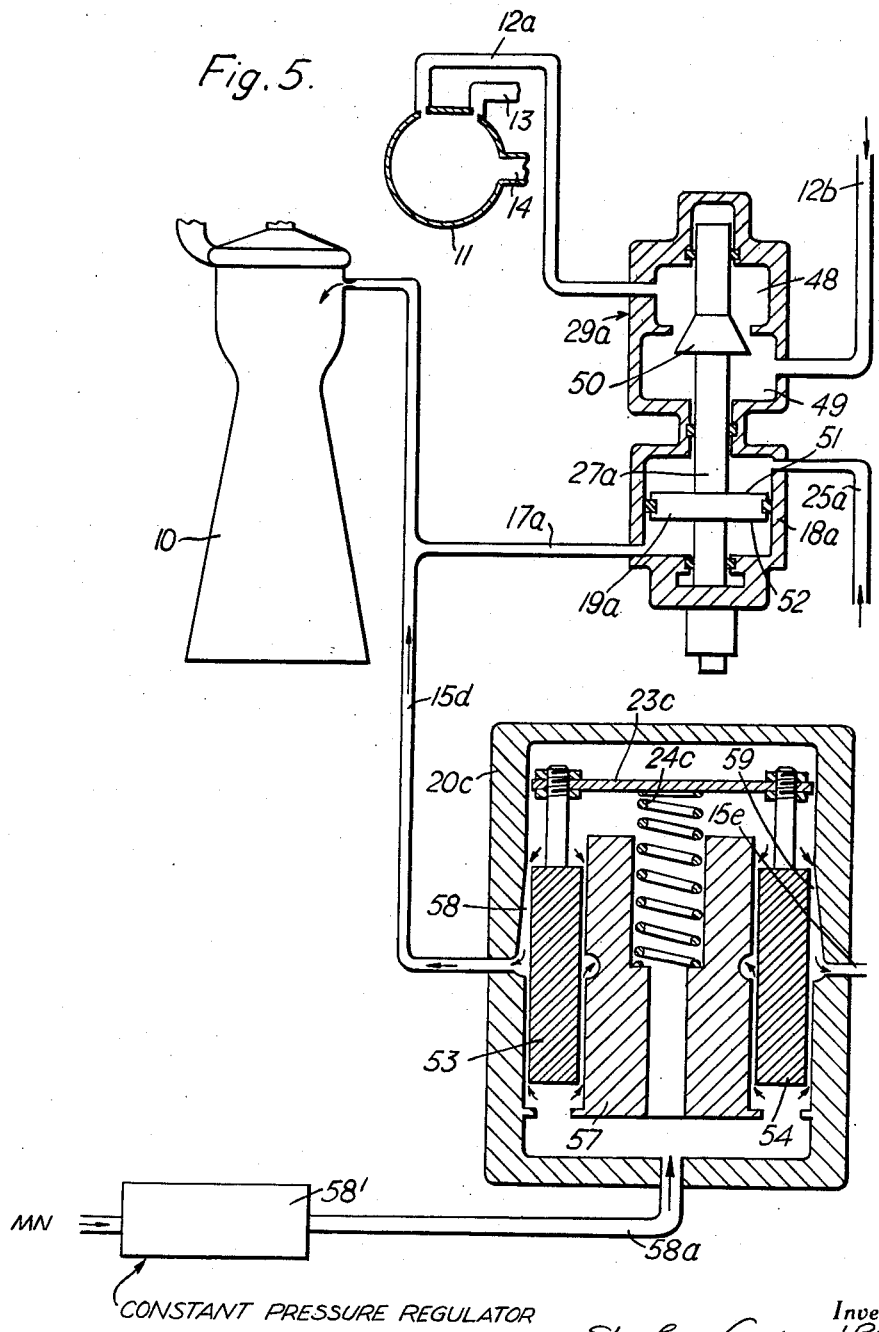

Oct. 15, 1963  S. L. BRAGG ETAL  3,106,822
ROCKET MOTOR
Filed May 23, 1960  5 Sheets-Sheet 4
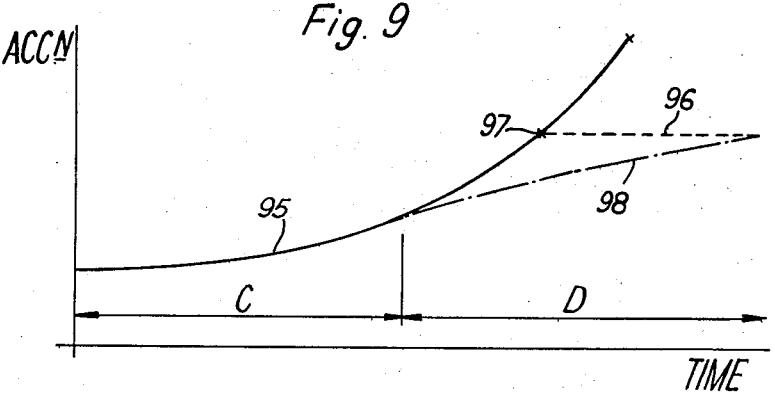
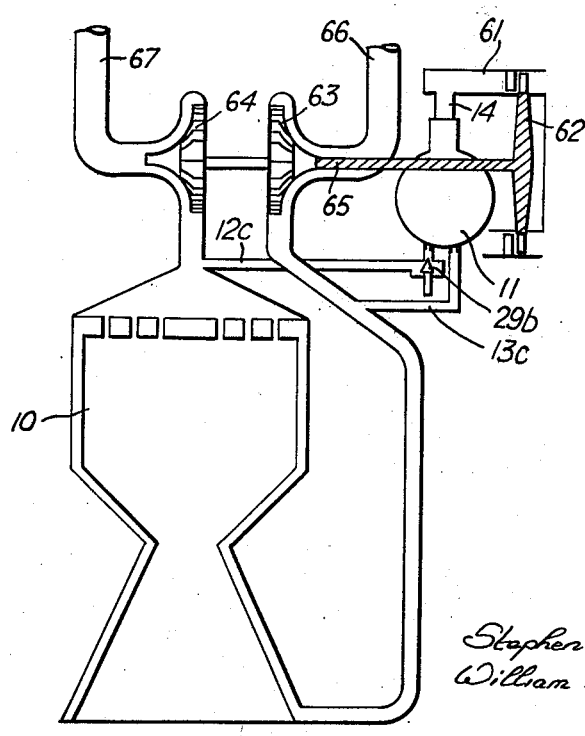
Stephen Lawrence Bragg,
William Roger Gibbings
Inventors
By
Fred L. Witherspoon, Jr. &
Fred E. Shoemaker  Attorneys Oct. 15, 1963 S. L. BRAGG ETAL 3,106,822
ROCKET MOTOR
Filed May 23, 1960 5 Sheets-Sheet 5

Inventors:
Stephen Lawrence Bragg, &
William Roger Gibbings
By
Fred L. Witherspoon, Jr., &
Fred E. Shoemaker  Attorneys United States Patent Office 3,106,822
Patented Oct. 15, 1963

3,106,822
ROCKET MOTOR
Stephen L. Bragg, Longlands, Findern, and William R. Gibbings, Derby, England, assignors to Rolls-Royce Limited, Derby, England, a company of Great Britain
Filed May 23, 1960, Ser. No. 31,203
Claims priority, application Great Britain May 28, 1959
13 Claims. (Cl. 60—35.6)

This invention relates to a rocket motor and more particularly to a rocket motor provided with a device for controlling the acceleration of a rocket of which the said motor forms part.

It will be appreciated that, in the absence of any other controlling factor, if a rocket proceeds with constant thrust the acceleration will steadily increase since the mass of the rocket is continually being reduced by the using up of fuel. If this acceleration is allowed to go on increasing indefinitely, the thrust acting on parts such as gyroscopic bearings may become excessive. For this reason it is advisable to limit the acceleration of the rocket, According therefore to the present invention, there is provided a rocket motor comprising a thrust chamber, a gas-containing chamber, means for ensuring that the pressure in the gas-containing chamber has a functional relationship with the pressure in the thrust chamber, acceleration responsive means for adjusting the pressure in the gas-containing chamber in accordance with the acceleration of the rocket motor, a source of reference pressure, pressure responsive means having opposite pressure faces open respectively to the pressure in the gas-containing chamber and to the source of reference pressure, and thrust control means, controlled by the pressure responsive means, for controlling the thrust produced in the thrust chamber.

The term "gas-containing chamber" is used in this specification in a broad sense to include any container (e.g. a pipe) containing a supply of gas.

The gas-containing chamber may be connected by a passage to a source of gas under pressure and there may be a valve controlling flow through said passage, the position of said valve being controlled by said acceleration responsive means. Thus the valve may be a needle valve carried by a weight, the needle valve being resiliently urged towards an at least partly closed position and the weight moving so as to effect opening of said valve when the acceleration of the rocket motor reaches a predetermined value.

The thrust control means may comprise a throttle which controls the supply of a combustible material to the thrust chamber of the motor.

Alternatively, the thrust control means may comprise a throttle which controls the supply of gas from a gas generator, the gas produced in the gas generator being employed to drive turbines, which in turn drive pumps, the pumps serving to pump combustible materials to the thrust chamber. Alternatively the thrust control means may comprise a throttle which controls the supply of a liquid oxidant and/or a liquid fuel to the said gas generator.

In one form of the present invention the rocket motor comprises a gas conduit arranged to be supplied with gas at a pressure functionally related to the thrust chamber pressure, and a duct communicating both with said conduit and with said gas-containing chamber, said conduit incorporating a nozzle which is choked when the acceleration of the motor is below a predetermined value and said duct communicating with said conduit at or downstream of said nozzle, the acceleration responsive means comprising means for unchoking the nozzle when the acceleration of the rocket motor has reached the said predetermined value.

The means for unchoking the nozzle preferably effects unchoking and progressive reduction of the pressure ratio across the nozzle as the acceleration increases beyond the said predetermined value.

Thus the arrangement may be such that a constant thrust chamber pressure control is provided for the initial part of the flight of a rocket incorporating the said rocket motor while the acceleration of the rocket may be controlled to a predetermined programme for the remainder of the flight of the rocket.

Preferably the acceleration responsive means comprises a valve which is urged towards the open position and which is arranged in a portion of said conduit downstream of said nozzle, the valve when open serving to vent said portion of the conduit and the valve when shut effecting sealing of said portion of the conduit and hence unchocking of the nozzle, and means for effecting shutting of the valve when the acceleration has reached the said predetermined value. Thus the means for effecting shutting of the valve may comprise a mass which is movable in response to the force set up by acceleration of the rocket and motor.

With this arrangement the beginning of the said predetermined program of acceleration control can be made to occur without the use of a separate timing device. This is because the said movable mass will move so as to effect shutting of the valve when the acceleration and therefore the mass of the rocket as a whole has a predetermined value. The mass of the rocket, however, depends upon the amount of fuel left and thus will depend upon the duration of the flight. Thus if a predetermined acceleration is selected it will correspond to a fixed flight time, since it will correspond to a fixed rocket mass.

The control of the said valve can therefore be made effective at a predetermined time by ensuring that the valve begins to move when the force due to acceleration, acting on the controlling mass (which can be a beam, for example), reaches a certain level. The valve can be profiled to give a predetermined acceleration program from this point onwards. The arrangement may also be such that, when the valve is fully closed, the thrust chamber pressure cannot be reduced below about half so as to ensure that failure of any means provided to urge the valve open does not result in shutting down the motor.

If it is though undesirable to employ the thrust chamber pressure itself in the said gas-containing chamber, the thrust chamber pressure can be initially balanced against, say, the pressure of a gas source (e.g. of nitrogen) and the gas pressure can then be used in the gas-containing chamber since the gas pressure will be the equivalent of or a function of chamber pressure.

The means for controlling the thrust produced in the thrust chamber or chambers may comprise a throttle which controls the supply of combustible material to a gas generator, the gas produced in the gas generator being employed to drive turbines which in turn drive pumps, the pumps serving to pump combustible materials to the thrust chamber or chambers of the motor.

The rocket motor may comprise two thrust chambers each of which has its thrust controlled by its own respective conduit, duct, nozzle, valve, pressure responsive means, and thrust control means, common valve shutting means being provided for effecting shutting of both said valves. A pressure sensitive device may be provided opposite faces of which are subjected to the gas pressures prevailing in the respective thrust chambers or are subjected to pressures functionally related thereto, said pressure sensitive device being connected to the common valve shutting means so as to effect differential closing of the valves to correspond to the difference in thrust produced by the respective thrust chambers.

Figure 2:
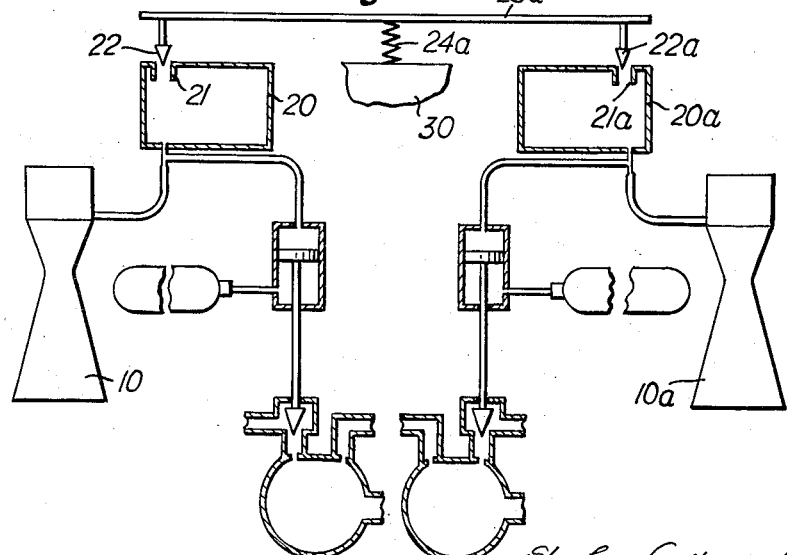
Figure 3:
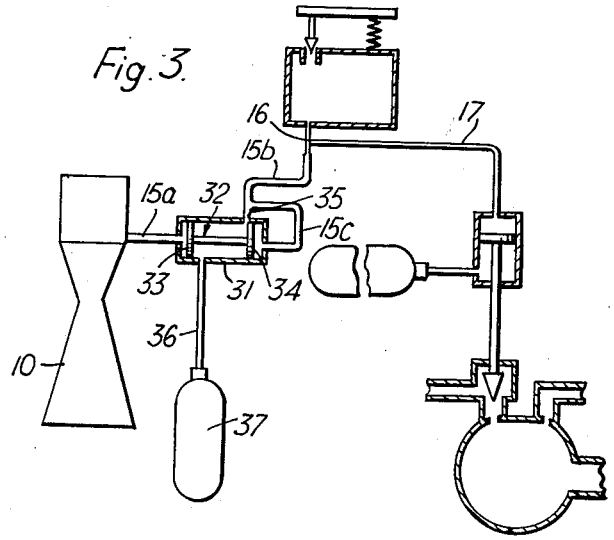
Figure 4:
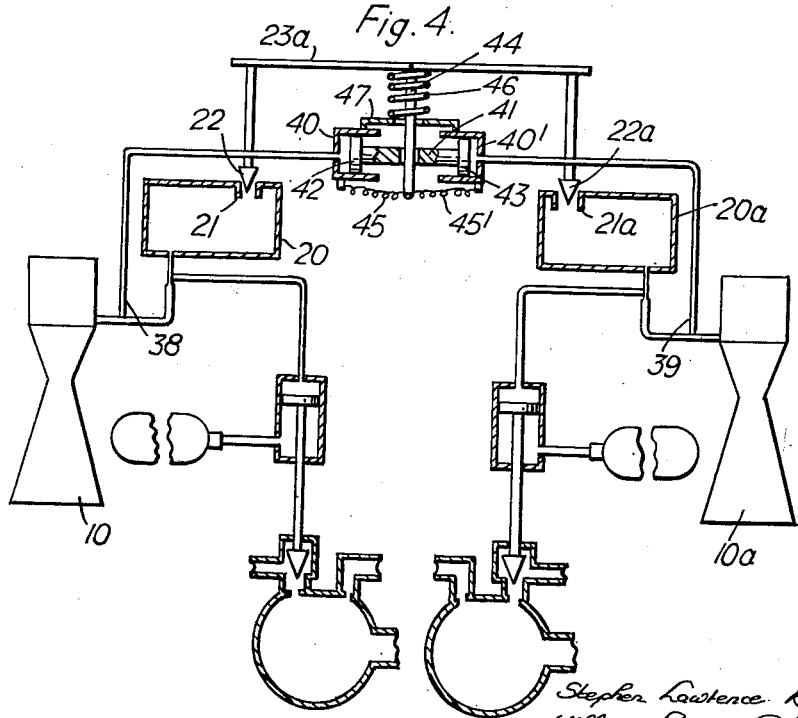
Figure 7:
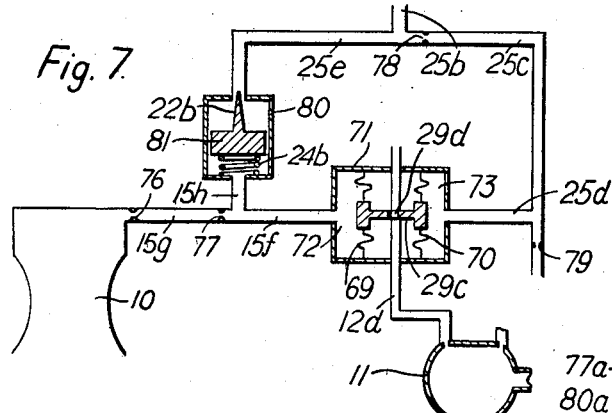
Figure 8:
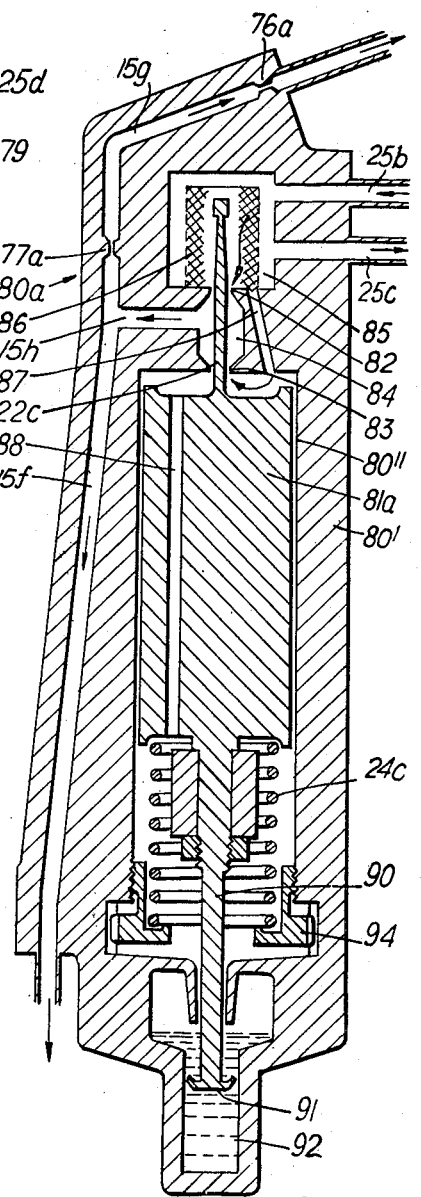

The invention is illustrated, merely by way of example, in the accompanying drawings in which:

FIGURE 1 is a diagrammatic representation of a rocket motor according to the present invention provided with a single thrust chamber, FIGURE 2 is a view similar to FIGURE 1 of a rocket motor provided with two thrust chambers, FIGURE 3 is a diagrammatic view of a modified rocket motor, FIGURE 4 is a diagrammatic view of yet another modified rocket motor in which there are two thrust chambers whose thrusts are balanced against each other, FIGURE 5 is a diagrammatic view, partly in section, of an alternative form of a rocket motor according to the present invention, FIGURE 6 illustrates in detail a part of the rocket motors shown in the preceding figures, FIGURE 7 is a diagrammatic view of a still further modified rocket motor according to the present invention, FIGURE 8 is a section through an acceleration control unit forming part of the construction shown in FIGURE 7, and FIGURE 9 is a graph illustrating the time/acceleration relationship of a rocket having a rocket motor according to the present invention.

In the following description corresponding parts of the various embodiments shown are given the same reference numerals, while parts of the later-described embodiments which are generally similar to those of the earlier described embodiments are given the same reference numerals with the addition of the suffixes $a$, $b$, etc.

The rocket motor shown in FIGURE 1 comprises a thrust chamber 10 which is supplied (by means not shown in FIGURE 1 but described below with reference to FIGURE 6) with liquid fuel and oxidant (e.g. liquid oxygen) for combustion therein. The liquid fuel and oxidant are delivered to the thrust chamber 10 by means of pumps which are driven by a common turbine, e.g. as described below with reference to FIGURE 6. The said turbine is itself driven by a supply of combustion gases produced in a gas generator 11. The gas generator 11 is provided with pipes 12, 13 for the supply thereto of liquid oxidant and liquid fuel respectively and with a gas outlet pipe 14 through which the combustion gases pass to the said turbine.

A conduit 15 communicates with the thrust chamber 10 so as to tap the pressure of the latter. The conduit 15 incorporates a nozzle or restriction 16. One end of a duct 17 communicates with the conduit 15 at or upstream of the throat of the nozzle 16, the other end of the duct 17 communicating with one end of a cylinder 18 in which works a piston 19.

The nozzle 16 communicates with a chamber 20 having an aperture 21 which is normally vented to atmosphere. The chamber 20 is provided to ensure loss of substantially all the dynamic head in the nozzle 16. The effective area of the aperture 21 is controlled by a needle valve 22 which is carried by a beam 23, the beam 23 being urged by a spring 24 to the position shown in which the aperture 21 is open.

The end of the cylinder 18 remote from the duct 17 communicates via a pipe 25 with a nitrogen bottle 26 or other source of fixed reference pressure. The movement of the piston 19 will therefore depend on the relative pressures in the duct 17 and pipe 25.

The piston 19 has a piston rod 27 which carries a needle valve 29 which controls oxidant flow from the pipe 12 and into the gas generator 11.

During the initial portion of the flight of the rocket, the beam 23 and needle valve 22 will remain in the position shown in FIGURE 1. During this initial part of the flight, if there should be a rise in the pressure in the thrust chamber 10 the piston 19 will move downwardly (as seen in FIGURE 1) with the result that the needle valve 29 will restrict oxidant flow into the gas generator 11. In consequence the supply of combustion gases to the turbine driving the oxidant and liquid fuel pumps will be diminished and therefore the supply of oxidant and liquid fuel delivered to the thrust chamber 10 will be correspondingly diminished with consequent reduction in the thrust produced. Accordingly the thrust will be maintained substantially constant during the said initial portion of the flight.

When the parts are in the positions shown in FIGURE 1 the aperture 21 is open and accordingly the nozzle 16 is choked, whereby the pressure in the duct 17 is substantially less than, but of course has a predetermined relationship with, the pressure in the conduit 15. The pressure in the duct 17 acts on the upper face of the piston 19 and the force so exerted on the piston 19 is arranged to be balanced by the force produced by the reference pressure which is provided by the nitrogen bottle 26 and which acts on the lower face of the piston 19.

When, however, the acceleration of the rocket increases beyond a predetermined value, the force acting on the beam 23 will cause the beam 23 to move downwardly relatively to the chamber 20 with the result that the aperture 21 will be progressively closed and the pressure ratio across the nozzle 16 will be progressively reduced. The pressure in the duct 17 will therefore rise towards that in the conduit 15 so as to move the piston 19 downwardly and therefore reduce the thrust produced in the thrust chamber 10.

The closing of the aperture 21 will therefore be achieved at a predetermined instant without the use of a timing device because the aperture 21 will close at a predetermined acceleration of the rocket and the acceleration of the rocket at any instant will depend upon its mass. The mass of the rocket, however, reduces as the fuel is used up and thus the mass of the rocket itself depends on flight time.

A stop (not shown) may be provided so as to prevent complete closure of the needle valve 22, whereby the motor cannot be throttled to less than a pre-set proportion of the initial thrust. The arrangement is such that, even if the valve 22 closes completely, the thrust chamber pressure cannot be reduced below a predetermined value (which is about one half of the normal pressure). This predetermined value is reached when the thrust chamber pressure force acting on the top face of the piston 19 is equal to the reference pressure force acting on the lower face thereof.

The arrangement shown in FIGURE 2 is substantially identical to that shown in FIGURE 1 except that the rocket motor illustrated in FIGURE 2 comprises two thrust chambers 10, 10a and hence two chambers 20, 20a having apertures 21, 21a respectively. The needle valves 22, 22a of the two chambers are carried at opposite ends of a common beam 23a which is urged upwardly by a spring 24a which is anchored to a fixed portion 30 of the motor.

In FIGURE 3 there is shown a rocket motor in which a conduit 15a communicates with the thrust chamber 10 and with one end of a cylinder 31 in which works a shuttle valve 32. The shuttle valve 32 carries pistons 33, 34 at opposite ends thereof. A conduit 15b communicates with the cylinder 31 at a port 35 which may be restricted by the piston 34, the conduit 15b having a portion 15c communicating with the end of the cylinder 31 remote from the conduit 15a. A pipe 36 communicates with the cylinder 31 between the pistons 33, 34 and also communicates with a nitrogen bottle 37. It will be appreciated that in this arrangement the pressure in the thrust chamber 10 is balanced against the pressure in the conduit 15b in which flows nitrogen from the nitrogen bottle 37. The conduit 15b communicates with a nozzle 16 and duct 17 identical to those of FIGURE 1.

In the FIGURE 3 arrangement the thrust chamber gases are not transferred throughout the system.

In FIGURE 4 there is shown an arrangement which is closely similar to that of FIGURE 2 except that the thrust chambers 10, 10a are respectively provided with pipes 38, 39 by means of which the pressures in the thrust chambers are fed to opposite ends of a cylinder device comprising spaced cylinder portions 40, 40'. A shuttle valve 41 carries at its opposite ends pistons 42, 43 which work in the cylinder portions 40, 40' respectively. The position of the shuttle valve 41 at any instant is therefore determined by the relative values of the thrust chambers 10, 10a.

The apertures 21, 21a of the chambers 20, 20a of FIGURE 4 are, as in the FIGURE 2 construction, controlled by needle valves 22, 22a carried by the common beam 23a. The beam 23a of FIGURE 4, however, carries a vertically disposed arm 44 and the end of the arm 44 remote from the beam 23a is connected by centralising springs 45, 45' to opposite ends of the cylinder device 40, 40'. The arm 44 passes through a hole in the shuttle valve 41 and coiled around the arm 44 is a spring 46 which reacts between the beam 23a and a spring plate 47 which bears on the cylinder portions 40, 40'. The beam 23a is thus urged towards a normal position by the spring 46 while the shuttle valve 41 is urged towards a central position by the springs 45, 45'. It will be appreciated that movement of the shuttle valve 41 effects pivotal movement of the beam 23a. The arrangement is such that if the thrust in the thrust chamber 10 is greater than that in the thrust chamber 10a, the beam 23a is moved so as to close the aperture 21 to a greater extent than the aperture 21a, whereby to restore the balance between the thrusts in the two thrust chambers.

In FIGURE 5 there is shown a modified rocket motor which works in a generally similar manner to that of FIGURES 1 and 2.

The rocket motor of FIGURE 5 comprises a thrust chamber 10 and a gas generator 11 which has a fuel inlet pipe 13 and a gas outlet pipe 14. The gas generator 11 is supplied with liquid oxidant through a pipe 12a which communicates with a chamber 48 in a throttle device 29a. The device 29a incorporates a chamber 49 which communicates with a liquid oxidant pipe 12b.

Communication between the chambers 48, 49 is controlled by a valve 50 mounted on a valve rod 27a. The latter carries a piston 19a working in a cylinder 18a. The face 51 of the piston 19a is subjected to a reference pressure applied through a pipe 25a. The opposite face 52 of the piston 19a is subjected to a pressure applied through a pipe 17a, the pipe 17a communicating with a conduit 15d leading to the thrust chamber 10.

The conduit 15d communicates with the interior of a chamber 20c within which are disposed a pair of weights 53, 54 connected together by a beam 23c. A spring 24c, acting between the beam 23c and a fixed member 57, urges the weight 53, 54 towards a predetermined position.

The interior of the chamber 20c is supplied with high pressure gaseous nitrogen (or other suitable gas, e.g. helium) via a pipe 58a. A regulator 58' is provided to maintain constant the pressure of the gas flowing through the pipe 58a. Both ends of the weights 53, 54 are acted upon by gaseous nitrogen at high pressure.

The conduit 15d, as stated above, communicates with the thrust chamber 10 and the chamber 20c is supplied with a conduit 15e which similarly communicates with another thrust chamber (not shown) of the motor. The conduits 15d, 15e provide for a nitrogen purge of the tapping lines to the respective thrust chambers.

During the initial portion of the flight of the rocket the weights 53, 54 are so positioned that they serve to restrict triangular shaped orifices 58, 59. In this position only a very small quantity of nitrogen passes through the orifice 58 and the pressure in the pipe 15d is substantially equal to the pressure in the thrust chamber 10. The pressure in the conduit 15d will be applied to the face 52 of the piston 19a and the throttle device 29a will therefore act to control oxidant flow to the gas generator 11, and hence the flow of combustible materials to the thrust chamber 10.

When, however, a predetermined acceleration is exceeded, the weights 53, 54 move downwardly so as to open the orifices 58, 59. Opening of these orifices 58, 59 permits nitrogen to flow through the conduits 15d, 17a, so as to act on the face 52 and hence reduce oxidant supply to the pipe 12a.

In FIGURE 6 there is shown a portion of a rocket motor corresponding to that of FIGURE 1. The said rocket motor comprises a gas generator 11 which supplies gases via an outlet pipe 14 to an annular duct 61.

The duct 61 supplies the gases to a turbine 62 which drives impellers 63, 64 through a shaft 65. The impellers 63, 64 effect pumping of liquid fuel and oxidant which is delivered to them through pipes 66, 67 respectively.

The gas generator 11 is supplied with liquid fuel and oxidant through branch pipes 13c, 12c, respectively which communicate respectively with the pipes 66, 67. The oxidant supply to the gas generator 11 is controlled by a needle valve 29b which controls flow through the branch pipe 12c.

In FIGURE 7 there is shown, very diagrammatically, a rocket motor comprising a thrust chamber 10 which is supplied with fuel and oxidant by pumps (not shown) the pumps being driven by a turbine (not shown) fed with gas produced in a gas generator 11. Oxidant flow through a pipe 12d to the gas generator 11 is controlled by a throttle 29c which extends transversely of the pipe 12d. The throttle 29c has a bore 29d therethrough which is movable into and out of axial alignment with the pipe 12d.

Opposite ends of the throttle 29c are carried by diaphragms 69, 70 which are mounted within a casing 71 so as respectively to constitute end walls of chambers 72, 73 therein. The chamber 72 communicates, by way of pipes 15f, 15g, with the thrust chamber 10, the pipe 15g having a major restriction 76 and a minor restriction 77 therein.

A source (not shown) of nitrogen (or other gas) at an adjustable reference pressure is connected by intercommunicating pipes 25b, 25c, 25d to the chamber 73. The pipe 25c has orifices 78, 79 therein, the downstream side of the orifice 79 being vented to atmosphere. The pipe 25b also communicates with a pipe 25e which leads to one end of an acceleration control unit 80 whose opposite end is connected by a pipe 15h to the pipe 15g.

A needle valve 22b, which is integral with a bob 81, is mounted within the acceleration control unit 80. A spring 24b normally urges the needle valve 22b upwardly and into a position in which only a small flow of nitrogen may pass from the pipe 25e to the pipe 15h.

It will be appreciated that, during the initial portion of the flight of the rocket, the parts will be positioned as shown in FIGURE 7. Accordingly, the pressure in the chamber 72 will be that of the thrust chamber 10 as augmented by the said small flow of nitrogen through the restrictions 76, 77, while the pressure in the chamber 73 will constitute a reference pressure determined by the relative restrictions of the orifices 78, 79. Variations of the pressure in the chamber 72 will therefore cause movement of the throttle 29c and this will effect appropriate adjustment of the oxidant supply to the gas generator 11. When, however, the acceleration of the rocket increases beyond a predetermined value, the force acting on the bob 81 will force the latter downwardly whereby the nitrogen flow through the pipe 25e and so to the thrust chamber 10 will increase whereby to increase the pressure in chamber 72 and cause the throttle 29c to throttle oxidant flow through the conduit 12d and hence reduce the thrust produced in the thrust chamber 10.

The nitrogen flow past the needle valve 22b during the said initial portion of the flight of the rocket is arranged to be small so that the pressure in the chamber 72 is only slightly above the pressure in the thrust chamber 10, the reference pressure in the chamber 73 being set at this value.

The provision of the restriction 76 makes it possible to avoid the use of very large flows of nitrogen.

In FIGURE 8 there is shown an acceleration control unit 80a which may be substituted for the unit 80 of FIGURE 7.

The unit 80a comprises a body 80' having a chamber 80" therein within which is mounted a bob 81a. The bob 81a has a needle valve 22c integral therewith, the needle valve 22c extending through and controlling flow through orifices 82, 83 at opposite ends of a chamber 84. The needle valve 22c has a portion which extends into a chamber 85 and which is mounted concentrically within a cylindrical filter 86.

The chamber 85 communicates with pipes 25b and 25c, and with a passage 87, the pipe 25b being supplied with nitrogen from a source (not shown), the pipe 25c communicating with the chamber 73 (FIGURE 7), and the passage 87 leading to the chamber 80".

The chamber 84 communicates with a passage 15h which leads to passages 15f, 15g. The passage 15g, which extends substantially axially of the acceleration control unit 80a and has a major restriction 76a and a minor restriction 77a, therein, leads to the thrust chamber 10 (FIGURE 7). The passage 15f, which also extends substantially axially of the unit 80a, leads to the chamber 72 (FIGURE 7).

The bob 81a, which has an axial bore 88 therethrough, has on its lower side an axial extension 90. The extension 90 has a head 91 which works freely in a dashpot cylinder 92.

The bob 81a is urged upwardly by a spring 24c which bears against a spring plate 94 which is adjustably threaded into the body 80'.

The operation of the unit 80a is substantially the same as that of the unit 80. Thus during the initial portion of the flight of the rocket the parts of the unit 80a are positioned as shown in FIGURE 8 and there is a small flow of nitrogen through the pipe 25b and via the orifices 82, 83 to the passages 15h. This small flow of nitrogen slightly augments the pressure in the chamber 72 (FIGURE 7).

When, however, the acceleration of the rocket increases beyond a predetermined value, the bob 81a moves downwardly against the spring 24c.

The nitrogen flow through the orifice 82 will therefore increase whereby to increase the pressure in the chamber 72 (FIGURE 7).

The function of the dashpot 92 is to damp out any random fluctuation of the bob positions caused by vibration of the unit as a whole.

FIGURE 9 shows a graph of acceleration plotted against time for a rocket provided with any of the motors described above. The firm line 95 shows what would happen if the motor were supplied with fuel at a constant rate. Because of the decreasing weight of the rocket as a whole the acceleration would rise steadily to levels at which the structure and guidance system would be affected. A simple acceleration limiting device would produce the effect shown as a dotted line 96 in which the acceleration is maintained substantially constant after the point 97. In this case, however, there is a very sharp change of rate of rise of acceleration at the point 97 and this is very undesirable.

A preferable arrangement, which is possible by use of the constructions shown in the drawings, is shown by the chain dotted line 98, in which the acceleration is gradually reduced so that it never exceeds the value at point 97, but reaches that value gradually without any sudden changes in rate of rise of acceleration. The acceleration may be controlled in accordance with the curve 98 by appropriate profiling of the needle valve 22.

We claim:

1. A rocket motor comprising a thrust chamber, a gas-containing chamber, means for ensuring that the pressure in the gas-containing chamber has a functional relationship with the pressure in the thrust chamber, acceleration responsive means for adjusting the pressure in the gas-containing chamber in accordance with the acceleration of the rocket motor, a source of reference pressure, means for comparing the pressures in the gas-containing chamber and in the source of reference pressure, and thrust control means, controlled by the pressure comparing means, for controlling the thrust produced in the thrust chamber.

2. A rocket motor comprising a thrust chamber, a gas-containing chamber, means for ensuring that the pressure in the gas-containing chamber has a functional relationship with the pressure in the thrust chamber, acceleration responsive means for adjusting the pressure in the gas-containing chamber in accordance with the acceleration of the rocket motor, a source of reference pressure, means for comparing the pressures in the gas-containing chamber and in the source of reference pressure, a passage connecting the gas-containing chamber to the source of reference pressure, a valve controlling flow through said passage, the position of said valve being controlled by said acceleration responsive means, and thrust control means, controlled by the pressure comparing means, for controlling the thrust produced in the thrust chamber.

3. A rocket motor comprising a thrust chamber, a gas-containing chamber, means for ensuring that the pressure in the gas-containing chamber has a functional relationship with the pressure in the thrust chamber, acceleration responsive means for adjusting the pressure in the gas-containing chamber in accordance with the acceleration of the rocket motor, a source of reference pressure, means for comparing the pressures in the gas-containing chamber and in the source of reference pressure, a passage connecting the gas-containing chamber to the source of reference pressure, a needle valve controlling flow through said passage, a weight connected to said needle valve, means urging the needle valve resiliently towards an at least partly closed position, the weight moving so as to effect opening of said needle valve when the acceleration of the rocket motor reaches a predetermined value, and thrust control means, controlled by the pressure comparing means, for controlling the thrust produced in the thrust chamber.

4. A rocket motor comprising a thrust chamber, means for supplying combustible materials to the thrust chamber, a gas-containing chamber, means for ensuring that the pressure in the gas-containing chamber has a functional relationship with the pressure in the thrust chamber, acceleration responsive means for adjusting the pressure in the gas-containing chamber in accordance with the acceleration of the rocket motor, a source of reference pressure, means for comparing the pressures in the gas-containing chamber and in the source of reference pressure, and a throttle which is controlled by the pressure comparing means and which controls the supply of a combustible material to the thrust chamber of the motor.

5. A rocket motor comprising a thrust chamber, a gas generator, turbine means driven by gas produced in the gas generator, pumps for pumping combustible materials to the thrust chamber, said pumps being driven by said turbine means, a gas-containing chamber, means for ensuring that the pressure in the gas-containing chamber has a functional relationship with the pressure in the thrust chamber, acceleration responsive means for adjusting the pressure in the gas-containing chamber in accordance with the acceleration of the rocket motor, a source of reference pressure, means for comparing the pressures in the gas-containing chamber and in the source of reference pressure, and a throttle, controlled by the pressure comparing means, for controlling the supply of gas from the gas generator to the turbine means.

6. A rocket motor comprising a thrust chamber, a conduit means to supply the conduit with gas at a pressure functionally related to the thrust chamber pressure, a nozzle which forms part of the conduit and which is choked when the acceleration of the motor is below a predetermined value, a duct communicating with said conduit adjacent said nozzle, acceleration responsive means serving to adjust the pressure in said conduit thus to unchoke the nozzle when the acceleration of the rocket motor has reached the predetermined value, a source of reference pressure, pressure responsive means having opposite pressure faces open respectively to the pressure in the duct and to the source of reference pressure, and thrust control means, controlled by the pressure responsive means, for controlling the thrust produced in the thrust chamber.

7. A rocket motor as claimed in claim 6 in which the means for unchoking the nozzle effects unchoking and progressive reduction of the pressure ratio across the nozzle as the acceleration increases beyond the said predetermined value.

8. A rocket motor comprising a thrust chamber, a conduit, means to supply the conduit with gas at a pressure functionally related to the thrust chamber pressure, a nozzle which forms part of the conduit and which is choked when the acceleration of the motor is below a predetermined value, a duct communicating with said conduit adjacent said nozzle, a valve which is urged towards the open position and which is arranged in a portion of said conduit downstream of said nozzle, the valve when open serving to vent said portion of the conduit and the valve when shut effecting sealing of said portion of the conduit and hence unchoking of the nozzle, acceleration responsive means for effecting shutting of the valve when the acceleration has reached the said predetermined value, a source of reference pressure, pressure responsive means having opposite pressure faces open respectively to the pressure in the duct and to the source of reference pressure, and thrust control means, controlled by the pressure responsive means, for controlling the thrust produced in the thrust chamber.

9. A rocket motor as claimed in claim 8 in which the means for effecting shutting of the valve comprises a mass which is movable in response to the force set up by acceleration of the motor.

10. A rocket motor as claimed in claim 8 in which there are two thrust chambers each of which has its thrust controlled by its own respective conduit, duct, nozzle, valve, pressure responsive means and thrust control means, common valve shutting means being provided for effecting shutting of both said valves.

11. A rocket motor as claimed in claim 10 comprising a pressure sensitive device opposite faces of which are subjected to pressures functionally related to those prevailing in the respective thrust chambers, said pressure sensitive device being connected to the common valve shutting means so as to effect differential closing of the valves to correspond to the difference in thrust produced by the respective thrust chambers.

12. A rocket motor as claimed in claim 6 in which the gas in the gas conduit is derived from a gas source, means being provided for balancing the pressure of said gas source against the pressure in said thrust chamber.

13. A rocket motor comprising a thrust chamber, a conduit, means for ensuring that the pressure in the conduit has a functional relationship with the pressure in the thrust chamber, a gas-containing chamber communicating with said conduit, a valve movement of which adjusts the pressure in said conduit, acceleration responsive means for moving the valve in a direction to permit increase in the pressure in the conduit when the acceleration of the rocket motor exceeds a predetermined value, a source of reference pressure, pressure responsive means having opposite pressure faces open respectively to the pressure in the gas-containing chamber and to the source of reference pressure, and thrust control means adjustable by the pressure responsive means, for controlling the thrust produced in the thrust chamber.

References Cited in the file of this patent

UNITED STATES PATENTS

| | | |
|---|---|---|
| 2,538,606 | Udale | Jan. 16, 1951 |
| 2,717,490 | Bottoms | Sept. 13, 1955 |
| 2,780,914 | Ring | Feb. 12, 1957 |

OTHER REFERENCES

"Rocket Propulsion Elements," by George P. Sutton, second edition, published by John Wiley and Sons, New York, New York, pp. 298, 299, 1956.